US006457934B2

(12) United States Patent
Li

(10) Patent No.: US 6,457,934 B2
(45) Date of Patent: Oct. 1, 2002

(54) CONNECTOR TUBE FOR A TURBINE ROTOR COOLING CIRCUIT

(75) Inventor: Ming Cheng Li, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 09/814,045

(22) Filed: Mar. 22, 2001

Related U.S. Application Data

(62) Division of application No. 09/384,198, filed on Aug. 27, 1999, now abandoned.

(51) Int. Cl.[7] .............................. F01D 5/08; F01D 5/18; F16L 25/00

(52) U.S. Cl. ......................... 415/115; 415/136; 285/298

(58) Field of Search ................................. 415/115, 175, 415/177, 178, 180, 134, 135, 136, 138; 285/187, 298; 416/96 R, 96 A

(56) References Cited

U.S. PATENT DOCUMENTS

| | | | | | |
|---|---|---|---|---|---|
| 683,584 | A | | 10/1901 | Wimmer | |
| 2,303,927 | A | | 12/1942 | Fogg | |
| 2,437,385 | A | | 3/1948 | Halford | |
| 3,199,294 | A | * | 8/1965 | Hagen | 415/115 |
| 3,339,832 | A | * | 9/1967 | Duecker | 415/134 X |
| 3,370,830 | A | * | 2/1968 | Nickles et al. | 416/95 |
| 5,064,223 | A | | 11/1991 | Gross | |
| 5,098,133 | A | | 3/1992 | Glover | |
| 5,205,593 | A | | 4/1993 | Fondeur | |
| 5,593,274 | A | | 1/1997 | Carreno et al. | 415/115 |
| 5,980,201 | A | * | 11/1999 | Benoist et al. | 415/115 |
| 5,984,637 | A | * | 11/1999 | Matsuo | 415/115 |
| 6,000,909 | A | * | 12/1999 | Hirokawa et al. | 415/115 |
| 6,029,695 | A | | 2/2000 | Logan | |
| 6,053,701 | A | * | 4/2000 | Ichiryu et al. | 415/115 |
| 6,149,074 | A | * | 11/2000 | Friedel et al. | 415/175 X |
| 6,190,127 | B1 | * | 2/2001 | Schmidt | 415/148 |
| 6,210,104 | B1 | * | 4/2001 | Schonenborn | 415/115 |
| 6,224,327 | B1 | * | 5/2001 | Aoki et al. | 415/115 X |

OTHER PUBLICATIONS

"39th GE Turbine State–of–the–Art Technology Seminar", Tab 1,""F" Technology—the First Half Million Operating Hours", H.E. Miller, Aug. 1996.

"39th GE Turbine State–of–the–Art Technology Seminar", Tab 2, "GE Heavy–Duty Gas Turbine Performance Characteristics", F. J. Brooks, Aug. 1996.

"39th GE Turbine State–of–the–Art Technology Seminar", Tab 3, "9EC 50Hz 170–MW Class Gas Turbine", A.S. Arrao, Aug. 1996.

"39th GE Turbine State–of–the–Art Technology Seminar", Tab 4, "MWS6001FA—An Advanced–Technology 70–MW Class 50/60 Hz Gas Turbine", Ramachandran et al., Aug. 1996.

"39th GE Turbine State–of–the–Art Technology Seminar", Tab 5, "Turbomachinery Technology Advances at Nuovo Pignone", Benvenuti et al., Aug. 1996.

"39th GE Turbine State–of–the–Art Technology Seminar", Tab 6, "GE Aeroderivative Gas Turbines—Design and Operating Features", M.W. Horner, Aug. 1996.

(List continued on next page.)

*Primary Examiner*—John E. Ryznic
(74) *Attorney, Agent, or Firm*—Nixon & Vanderhye P.C.

(57) ABSTRACT

A tubular connector adapted to extend between two tubular components comprising a tubular body having an internal diameter, a first free end including an annular radial flange having a tapered surface adapted to engage a complementary seating surface on a first of the two tubular components, the internal diameter remaining constant through the first free end; and a second free end having an annular bulbous shape adapted to seat within a cylindrical end of a second of the two tubular components.

5 Claims, 2 Drawing Sheets

OTHER PUBLICATIONS

"$39^{th}$ GE Turbine State–of–the–Art Technology Seminar", Tab 7, "Advance Gas Turbine Materials and Coatings", P.W. Schilke, Aug. 1996.
"$39^{th}$ GE Turbine State–of–the–Art Technology Seminar", Tab 8, "Dry Low $NO_x$ Combustion Systems for GE Heavy–Duty Turbines", L. B. Davis, Aug. 1996.
"$39^{th}$ GE Turbine State–of–the–Art Technology Seminar", Tab 9, "GE Gas Turbine Combustion Flexibility", M. A. Davi, Aug. 1996.
"$39^{th}$ GE Turbine State–of–the–Art Technology Seminar", Tab 10, "Gas Fuel Clean–Up System Design Considerations for GE Heavy–Duty Gas Turbines", C. Wilkes, Aug. 1996.
"$39^{th}$ GE Turbine State–of–the–Art Technology Seminar", Tab 11, "Integrated Control Systems, for Advanced Combined Cycles", Chu et al., Aug. 1996.
"$39^{th}$ GE Turbine State–of–the–Art Technology Seminar", Tab 12, "Power Systems for the 21st Century "H" Gas Turbine Combined Cycles", Paul et al., Aug. 1996.
"$39^{th}$ GE Turbine State–of–the–Art Technology Seminar", Tab 13, "Clean Coal and Heavy Oil Technologies for Gas Turbines", D. M. Todd, Aug. 1996.
"$39^{th}$ GE Turbine State–of–the–Art Technology Seminar", Tab 14, "Gas Turbine Conversions, Modifications and Uprates Technology", Stuck et al., Aug. 1996.
"$39^{th}$ GE Turbine State–of–the–Art Technology Seminar", Tab 15, "Performance and Reliability Improvements for Heavy–Duty Gas Turbines, "J. R. Johnston, Aug. 1996.
"$39^{th}$ GE Turbine State–of–the–Art Technology Seminar", Tab 16, "Gas Turbine Repair Technology", Crimi et al, Aug. 1996.
"$39^{th}$ GE Turbine State–of–the–Art Technology Seminar", Tab 17, "Heavy Duty Turbine Operating & Maintenance Considerations", R. F. Hoeft, Aug. 1996.
"$39^{th}$ GE Turbine State–of–the–Art Technology Seminar", Tab 18, "Gas Turbine Performance Monitoring and Testing", Schmitt et al., Aug. 1996.
"$39^{th}$ GE Turbine State–of–the–Art Technology Seminar", Tab 19, "Monitoring Service Delivery System and Diagnostics", Madej et al., Aug. 1996.
"$39^{th}$ GE Turbine State–of–the–Art Technology Seminar", Tab 20, "Steam Turbines for Large Power Applications", Reinker et al., Aug. 1996.
"$39^{th}$ GE Turbine State–of–the–Art Technology Seminar", Tab 21, "Steam Turbines for Ultrasupercritical Power Plants", Retzlaff et al., Aug. 1996.
"$39^{th}$ GE Turbine State–of–the–Art Technology Seminar", Tab 22, "Steam Turbine Sustained Efficiency", P. Schofield, Aug. 1996.
"$39^{th}$ GE Turbine State–of–the–Art Technology Seminar", Tab 23, "Recent Advances in Steam Turbines for Industrial and Cogeneration Applications", Leger et al., Aug. 1996.
"$39^{th}$ GE Turbine State–of–the–Art Technology Seminar", Tab 24, "Mechanical Drive Steam Turbines", D. R. Leger, Aug. 1996.
"$39^{th}$ GE Turbine State–of–the–Art Technology Seminar", Tab 25, "Steam Turbines for STAG™ Combined–Cycle Power Systems", M. Boss, Aug. 1996.
"$39^{th}$ GE Turbine State–of–the–Art Technology Seminar", Tab 26, "Cogeneration Application Considerations", Fisk et al., Aug. 1996.
"$39^{th}$ GE Turbine State–of–the–Art Technology Seminar", Tab 27, "Performance and Economic Considerations of Repowering Steam Power Plants", Stoll et al., Aug. 1996.
"$39^{th}$ GE Turbine State–of–the–Art Technology Seminar", Tab 28, "High–Power–Density™ Steam Turbine Design Evolution", J. H. Moore, Aug. 1996.
"$39^{th}$ GE Turbine State–of–the–Art Technology Seminar", Tab 29, "Advances in Steam Path Technologies", Cofer, IV, et al., Aug. 1996.
"$39^{th}$ GE Turbine State–of–the–Art Technology Seminar", Tab 30, "Upgradable Opportunities for Steam Turbines", D. R. Dreier, Jr., Aug. 1996.
"$39^{th}$ GE Turbine State–of–the–Art Technology Seminar", Tab 31, "Uprate Options for Industrial Turbines", R. C. Beck, Aug. 1996.
"$39^{th}$ GE Turbine State–of–the–Art Technology Seminar", Tab 32, "Thermal Performance Evaluation and Assessment of Steam Turbine Units", P. Albert, Aug. 1996.
"$39^{th}$ GE Turbine State–of–the–Art Technology Seminar", Tab 33, "Advances in Welding Repair Technology" J. F. Nolan, Aug. 1996.
"$39^{th}$ GE Turbine State–of–the–Art Technology Seminar", Tab 34, "Operation and Maintenance Strategies to Enhance Plant Profitability", MacGillivray et al., Aug. 1996.
"$39^{th}$ GE Turbine State–of–the–Art Technology Seminar", Tab 35, "Generator Insitu Inspections", D. Stanton.
"$39^{th}$ GE Turbine State–of–the–Art Technology Seminar", Tab 36, "Generator Upgrade and Rewind", Halpern et al., Aug. 1996.
"$39^{th}$ GE Turbine State–of–the–Art Technology Seminar", Tab 37, "GE Combined Cycle Product Line and Performance", Chase, et al., Aug. 1996.
"$39^{th}$ GE Turbine State–of–the–Art Technology Seminar", Tab 38, "GE Combined Cycle Experience", Maslak et al., Aug. 1996.
"$39^{th}$ GE Turbine State–of–the–Art Technology Seminar", Tab 39, "Single–Shaft Combined Cycle Power Generation Systems", Tomlinson et al., Aug. 1996.
"Advanced Turbine System Program—Conceptual Design and Product Development", Annual Report, Sep. 1, 1994–Aug. 31, 1995.
"Advanced Turbine Systems (ATS Program) Conceptual Design and Product Development", Final Technical Progress Report, Vol. 2–Industrial Machine, Mar. 31, 1997, Morgantown, WV.
"Advanced Turbine Systems (ATS Program) Conceptual Design and Product Development", Final Technical Progress Report, Aug. 31, 1996, Morgantown, WV.
"Advanced Turbine Systems (ATS) Program, Phase 2, Conceptual Design and Product Development", Yearly Technical Progress Report, Reporting Period: Aug. 25, 1993–Aug. 31, 1994.
"Advanced Turbine Systems" Annual Program Review, Preprints, Nov. 2–4, 1998, Washington, D.C. U.S. Department of Energy, Office of Industrial Technologies Federal Energy Technology Center.
"ATS Conference" Oct. 28, 1999, Slide Presentation.
"Baglan Bay Launch Site", various articles relating to Baglan Energy Park.
"Baglan Energy Park", Brochure.
"Commercialization", Del Williamson, Present, Global Sales, May 8, 1998.
"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Numbers DE–FC21–95MC31176–11.

"Exhibit panels used at 1995 product introduction at PowerGen Europe".
"Extensive Testing Program Validates High Eficiency, reliability of GE's Advanced "H" Gas Turbine Technology", Press Information, Press Release, 96–NR14, Jun. 26, 1996, H Technology Tests pp. 1–4.
"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp.1–6.
"Gas, Steam Turbine Work as Single Unit in GE's Advanced H Technology Combined–Cycle System", Press Information, Press Release, 95–NR18, May 16, 1995, Advanced Technology Introduction/pp. 1–3.
"GE Breaks 60% Net Efficiency Barrier" paper, 4 pages.
"GE Businesses Share Technologies and Experts to Develop State–Of–The–Art Products", Press Information, Press Release 95–NR10, May 16, 1995, GE Technology Transfer/ pp. 1–3.
"General Electric ATS Program Technical Review, Phase 2 Activities", T. Chance et al., pp. 1–4.
"General Electric's DOE/ATS H Gas Turbine Development" Advanced Turbine Systems Annual Review Meeting, Nov. 7–8, 1996, Washington, D.C., Publication Release.
"H Technology Commercialization", 1998 MarComm Activity Recommendation, Mar., 1998.
"H Technology", Jon Ebacher, VP, Power Gen Technology, May 8, 1998.
"H Testing Process", Jon Ebacher, VP, Power Gen Technology, May 8, 1998.
"Heavy–Duty & Aeroderivative Products" Gas Turbines, Brochure, 1998.
"MS7001H/MS9001H Gas Turbine, gepower.com website for PowerGen Europe" Jun. 1–3 going public Jun. 15, (1995).
"New Steam Cooling System is a Key to 60% Efficiency for GE "H" Technology Combined–Cycle Systems", Press Information, Press Release, 95–NRR16, May 16, 1995, H Technology/pp. 1–3.
"Overview of GE's H Gas Turbine Combined Cycle", Jul. 1, 1995 to Dec. 31, 1997.
"Power Systems for the 21$^{ST}$Century —"H" Gas Turbine Combined Cycles", Thomas C. Paul et al., Report.
"Power–Gen '96 Europe", Conference Programme, Budapest, Hungary, Jun. 26–28, 1996.
"Power–Gen International", 1998 Show Guide, Dec. 9–11, 1998, Orange County Convention Center, Orlando, Florida.
"Press Coverage following 1995 product announcement"; various newspaper clippings relating to improved generator.
"Proceedings of the Advanced Turbine Systems Annual Program Review Meeting", vol. I, "Industrial Advanced Turbine Systems Program Overview", D.W. Esbeck, pp. 3–13, Oct., 1995.
"Proceedings of the Advanced Turbine Systems Annual Program Review Meeting", vol. I, "H Gas Turbine Combined Cycle", J. Corman, pp. 14–21, Oct., 1995.
"Proceedings of the Advanced Turbine Systems Annual Program Review Meeting", vol. I, "Overview of Westinghouse's Advanced Turbine Systems Program", Bannister et al., pp. 22–30, Oct., 1995.
"Proceedings of the Advanced Turbine Systems Annual Program Review Meeting", vol. I, "Allison Engine ATS Program Technical Review", D. Mukavetz, pp. 31–42, Oct., 1995.
"Proceedings of the Advanced Turbine Systems Annual Program Review Meeting", vol. I, "Advanced Turbine Systems, Program Industrial System Concept Development", S. Gates, pp. 43–63, Oct., 1995.
"Proceedings of the Advanced Turbine Systems Annual Program Review Meeting", vol. I, "Advanced Turbine System Program Phase 2 Cycle Selection", Latcovich, Jr., pp. 64–69, Oct., 1995.
"Proceedings of the Advanced Turbine Systems Annual Program Review Meeting", vol. I, "General Electric ATS Program Technical Review Phase 2 Activities", Chance et al., pp. 70–74, Oct., 1995.
"Proceedings of the Advanced Turbine Systems Annual Program Review Meeting", vol. I, "Technical Review of Westinghouse's Advanced Turbine Systems Program", Diakunchak et al., pp. 75–86, Oct., 1995.
"Proceedings of the Advanced Turbine Systems Annual Program Review Meeting", vol. I, "Advanced Combustion Turbines and Cycles: An EPRI Perspective", Touchton et al., pp. 87–88, Oct., 1995.
"Proceedings of the Advanced Turbine Systems Annual Program Review Meeting", vol. I, "Advanced Turbine Systems Annual Program Review", William E. Koop, pp. 89–92, Oct., 1995.
"Proceedings of the Advanced Turbine Systems Annual Program Review Meeting", vol. I, "The AGTSR Consortium: An Update", Fant et al., pp. 93–102, Oct., 1995.
"Proceedings of the Advanced Turbine Systems Annual Program Review Meeting", vol. I, "Overview of Allison/ AGTSR Interactions", Sy A. Ali, pp. 103–106, Oct., 1995.
"Proceedings of the Advanced Turbine Systems Annual Program Review Meeting", vol. I, "Design Factors for Stable Lean Premix Combustion", Richards et al., pp. 107–113, Oct., 1995.
"Proceedings of the Advanced Turbine Systems Annual Program Review Meeting", vol. I, "Ceramic Stationary as Turbine", M. van Roode, pp. 114–147, Oct., 1995.
"Proceedings of the Advanced Turbine Systems Annual Program Review Meeting", vol. I, "DOE/Allison Ceramic Vane Effort", Wenglarz et al., pp. 148–151, Oct., 1995.
"Proceedings of the Advanced Turbine Systems Annual Program Review Meeting", vol. I, "Materials/Manufacturing Element of the Advanced Turbine Systems Program", Karnitz et al., pp. 152–160, Oct., 1995.
"Proceedings of the Advanced Turbine Systems Annual Program Review Meeting", vol. I, "Land–Based Turbine Casting Initiative", Mueller et al., pp. 161–170, Oct., 1995.
"Proceedings of the Advanced Turbine Systems Annual Program Review Meeting", vol. I, "Turbine Airfoil Manufacturing Technology", Kortovich, pp. 171–181, Oct., 1995.
"Proceedings of the Advanced Turbine Systems Annual Program Review Meeting", vol. I, "Pratt & Whitney Thermal Barrier Coatings", Bornstein et al., pp. 182–193, Oct., 1995.
"Proceedings of the Advanced Turbine Systems Annual Program Review Meeting", vol. I, "Westinhouse Thermal Barrier Coatings", Goedjen et al., pp. 194–199, Oct., 1995.
"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low $No_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting, vol. II", The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Stem Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement"M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515 Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–100, Nov., 1996.

"Proceedings of the Advanced Turbine Systems Annual Program Review Meeting", "$NO_X$ and CO Emissions Models for Gas–Fired Lean–Premixed Combustion Turbines", A. Mellor, p. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", "Active Control of Combustion Instabilities in Low $NO_X$ Turbines", Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535–552, Nov., 1996.

"Proceedings of the Advanced Turbine Systems Annual Program Review Meeting", "ATS Materials Suport", Michael Karnitz, pp. 553–576, Nov., 1996.

"Proceedings of the Advanced Turbine Systems Annual Program Review Meeting", "Land Based Turbine Casting Initiative", Boyd A. Meuller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, pp. 671, Nov., 1996.

"Status Report: The U.S. Department of of Energy's Advanced Turbine Systems Program", facsimile dated Nov. 7, 1996.

"Testing Program Results Validate GE's H Gas Turbine—High Efficiency, Low Cost of Eelctricity and Low Emissions", Roger Schonewald and Patrick Marolda, (no date available).

"Testing Program Results Validate GE's Gas Turbine—High Efficiency, Low Cost of Eelctricity and Low Emissions", Slide Presentation—working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Numbers: DOE/MC/31176–5628.

"Utility Advanced Turbine System (ATS) Technology Readiness Testing—Phase 3", Document #666274 Oct. 1, 1996–Sep. 30, 1997, Publication Date, Dec. 31, 1997, Report Numbers: DOE/MC/31176–10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Numbers: DOE/MC/31176 5340.

"Utility Advanced Turbine System (ATS) Technology Readiness Testing and Pre–Commercial Demonstration, Phase 3", Document #486132, Apr. 1–Jun. 30, 1976, Publication Date, Dec. 31, 1996, Report Numbers: DOE/MC/31176–5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Numbers: DOE/MC31176–5339.

"Utility Advanced Turbine System (ATS) Technology Readiness Testing and Pre–Commercial Demonstration," Document #666277, Apr. 1–Jun. 30, 1997, Publication Date, Dec. 31, 1997, Report Numbers: DOE/MC/31176–8.

"Utility Advanced Turbine System (ATS) Technology Readiness Testing and Pre–Commercialization Demonstration"Jan. 1–Mar. 31, 1996, DOE/MC/31176–5338.

"Utility Advanced Turbine System (ATS) Technology Readiness Testing: Phase 3R", Document #756552, Apr. 1–Jun. 30, 1999, Publication Date, Sep. 1, 1999, Report Numbers: DE–FC21–95MC31176–23.

"Utility Advanced Turbine System (ATS) Technology Readiness Testing.", Document #656823, Jan. 1–Mar. 31, 1998, Publication Date, Aug. 1, 1998, Report Numbers: DOE/MC/31176–17.

"Utility Advanced Turbine System (ATS) Technology Readiness Testing and Pre–Commercial Demonstration", Annual Technical Progress Report, Reporting Period: Jul. 1, 1995–Sep. 30, 1996.

"Utility Advanced Turbine System (ATS) Technology Readiness Testing", Phase 3R, Annual Technical Progress Report, Reporting Period: Oct. 1, 1997–Sep. 30, 1998.

"Utility Advanced Turbine System (ATS) Technology Readiness Testing", Document #750405, Oct. 1–Dec. 30, 1998, Publication Date: May, 1, 1999, Report Numbers: DE–FC21–95MC31176–20.

"Utility Advanced Turbine System (ATS) Technology Readiness Testing", Document #1348, Apr. 1–Jun. 29, 1998, Publication Date Oct. 29, 1998, Report Numbers DE–FC21–95MC31176–18.

"Utility Advanced Turbine System (ATS) Technology Readiness Testing—Phase 3", Annual Technical Progress Report, Reporting Period: Oct. 1, 1996–Sep. 30, 1997.

"Utility Advanced Turbine System (ATS) Technology Readiness Testing and Pre–Commercial Demonstration", Quarterly Report, Jan. 1–Mar. 31, 1997, Document #666275, Report Numbers: DOE/MC/31176–07.

"Proceedings of the 1997 Advanced Turbine Systems", Annual Program Review Meeting, Oct. 28–29, 1997.

* cited by examiner

CONNECTOR TUBE FOR A TURBINE ROTOR COOLING CIRCUIT

This application is a division of application Ser. No. 09/384,198, filed Aug. 27, 1999, now abandoned.

This invention was made with Government support under Contract No. DE-FC21-95MC31176 awarded by the Department of Energy. The Government has certain rights in this invention.

BACKGROUND OF THE INVENTION

This invention relates generally to land based gas turbine power plants, and specifically to a tubular connector used to radially connect axially extending cooling tubes in a gas turbine rotor cooling circuit.

A steam cooling circuit for a gas turbine rotor is disclosed in commonly owned U.S. Pat. No. 5,593,274. Briefly, cooling steam is supplied via a tube concentric to the rotor and then via radial passages to axially extending tubes (parallel to but radially outwardly of the rotor axis) which supply cooling steam to the buckets of one or more of the turbine stages. A similar return path is employed to remove the steam. Because of the rotating environment of the turbine rotor assembly and the centrifugal forces generated thereby, and because of thermal expansion of the various components, any radially oriented coolant tubes must be designed to accommodate relative axial and radial shifting movements where the radial tubes interface at opposite ends with the axial tube fittings.

BRIEF SUMMARY OF THE INVENTION

This invention relates to a tube having coupling profiles at opposite ends which are particularly advantageous in the context of radial connecting tubes in a rotating environment. Specifically, the tubes to be coupled are substantially parallel but radially offset relative to the rotor axis. The fittings which mate with the tube of this invention, however, are in axial alignment with the radial tube. For purposes of this discussion, and unless otherwise explained, references to radial vs. axial or to radially "outer" or radially "inner," take into account the orientation of the tube as installed in a turbine rotor assembly. References to the "upper" or "lower" ends of the tube correspond to radially outer and inner ends of the tube, respectively, relative to the rotor axis. Reference to a "radial flange" on the tube, however, is made with respect to the longitudinal center axis of the tube itself.

In one exemplary embodiment, the radially outer or upper end of the tube has an enlarged radial flange (but with a constant tube ID) formed with a tapered edge, the taper extending inwardly toward the longitudinal center axis of the tube in an upward or radially outer direction. This taper is part spherical in shape so that engagement with a flat conical seat formed on an axially aligned end of an elbow component attached to the radially outer axial cooling tube is substantially tangential. As a result, the radially outer or upper tube end is able to "roll" in the seat in virtually any direction, thus accommodating relative shifting movement between the radially oriented tube and the axial tubes to which it is coupled while, at the same time resisting any radially outward movement which might otherwise occur due to centrifugal forces generated by rotation of the rotor.

The radially inner or lower end of the tube is formed as a "half-spoolie," i.e., the lower free end of the tube is expanded to form a part toroid, formed by a part spherical surface. In other words, an annular groove is formed about the tube end, while the thickness of the tube wall remains substantially constant. This end of the tube is slidably received in a radially extending cylindrical bushing formed in the radially inner, axially extending tube. This arrangement results in tangential line contact at the interface of the tube and a cylindrical ID of the bushing. There is no restraint on any radial movement of the tube at this end, however, (i.e., other than friction) so that the tube can thermally expand in a radially inner direction relative to the rotor axis, even though the tube is constrained against thermal growth at the radially outer end thereof.

Accordingly, in its broader aspects, the invention relates to a tubular connector adapted to extend between two tubular components comprising a tubular body having an internal diameter, a first free end including an annular radial flange having a tapered surface adapted to engage a complementary seating surface on a first of the two tubular components, the internal diameter remaining constant through the first free end; and a second free end having an annular bulbous shape adapted to seat within a cylindrical end of a second of the two tubular components.

DETAILED DESCRIPTION OF THE INVENTION

Figure 1:
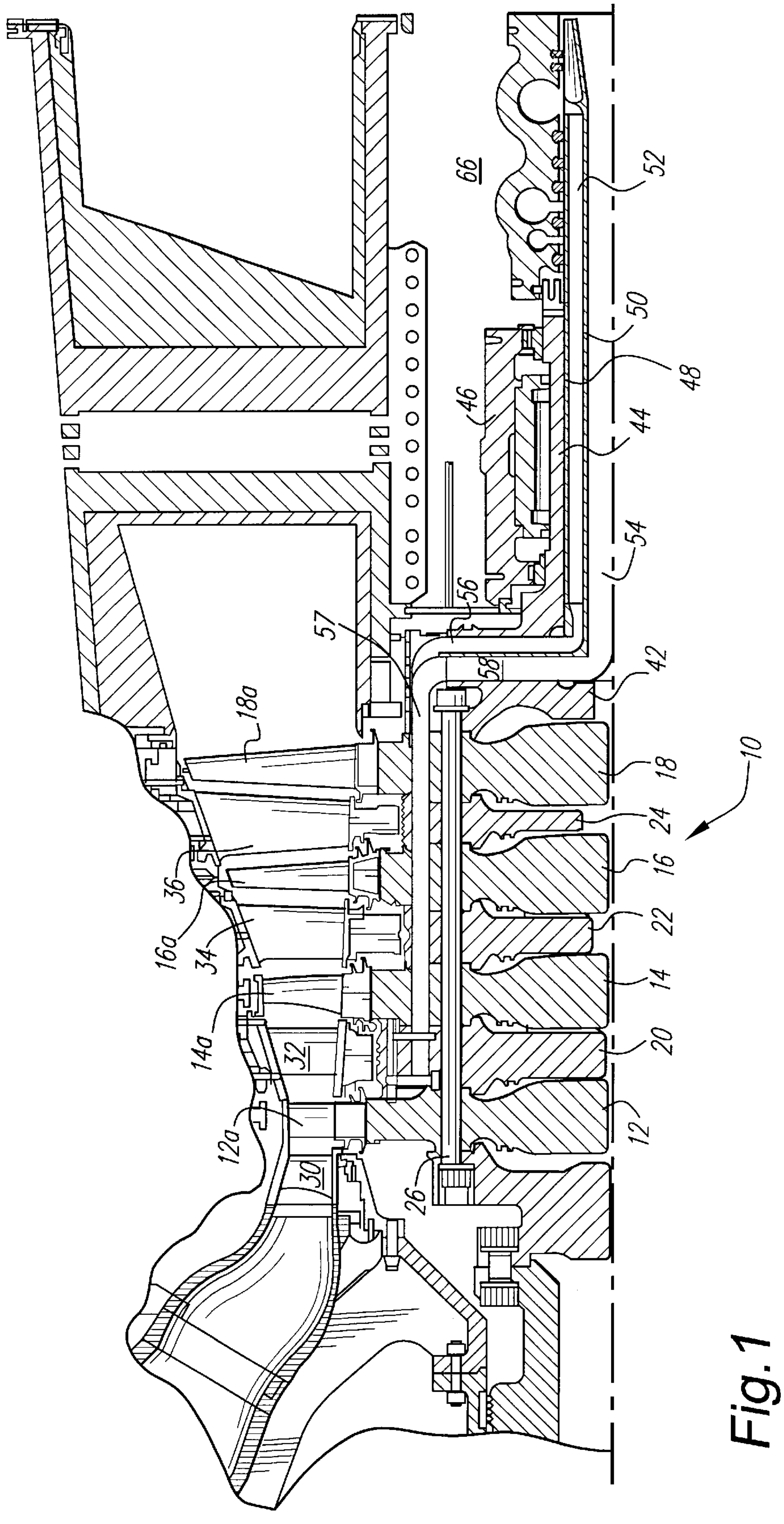
FIG. 1 is a partial side section of a gas turbine rotor assembly incorporating the connector tube of this invention.

Referring now to the drawings, there is illustrated a portion of a turbine, including a turbine rotor assembly, generally designated 10, comprised of axially stacked components, for example, rotor wheels 12, 14, 16 and 18 which form portions of a four-stage exemplary turbine rotor with spacers 20, 22 and 24 alternating between the wheels. The wheel and spacer elements are held together on the rotor by a plurality of elongated, circumferentially extending bolts, only one of which is illustrated at 26. The wheels 12, 14, 16 and 18 mount a plurality of circumferentially spaced turbine buckets 12*a*, 14*a*, 16*a* and 18*a*, respectively. The combination of nozzles 30, 32, 34 and 36 and respective wheels 12, 14, 16 and 18 comprise the stages of the turbine. An aft shaft wheel 42 forms part of the rotor 10 and is bolted to the stacked wheels and spacers.

In an advanced gas turbine designed by the assignee hereof, the aft shaft 44 houses a bore tube assembly described and illustrated in detail in co-pending U.S. patent application Ser. No. 09/216,363 (Attorney Docket No. 839540). Briefly, the bore tube assembly includes axially extending outer and inner tubes 48 and 50, respectively, defining an annular steam-cooling supply passage 52 and a spent steam-cooling return passage 54. The passages 52 and 54 communicate steam to and from the outer rim of the rotor through sets of radially extending conduits or tubes 56 and 58, respectively, which in turn communicate with corresponding sets of axially extending tubes spaced circumferentially about the rim of the rotor. The steam supplied through the steam supply passage 52 and radial tubes 56 supply cooling steam to buckets 12*a* and 14*a* of the first and second stages, respectively, via axially extending tubes (not shown), while axial tubes (one shown at 57) and radial tubes 58 and return passage 54 receive the spent cooling steam from the buckets for return to a stationary or static pipe (not shown). It will be appreciated that the bore tubes 48 and 50 as well as axial tubes 57 are part of and rotate with the rotor assembly 10.

Figure 2:
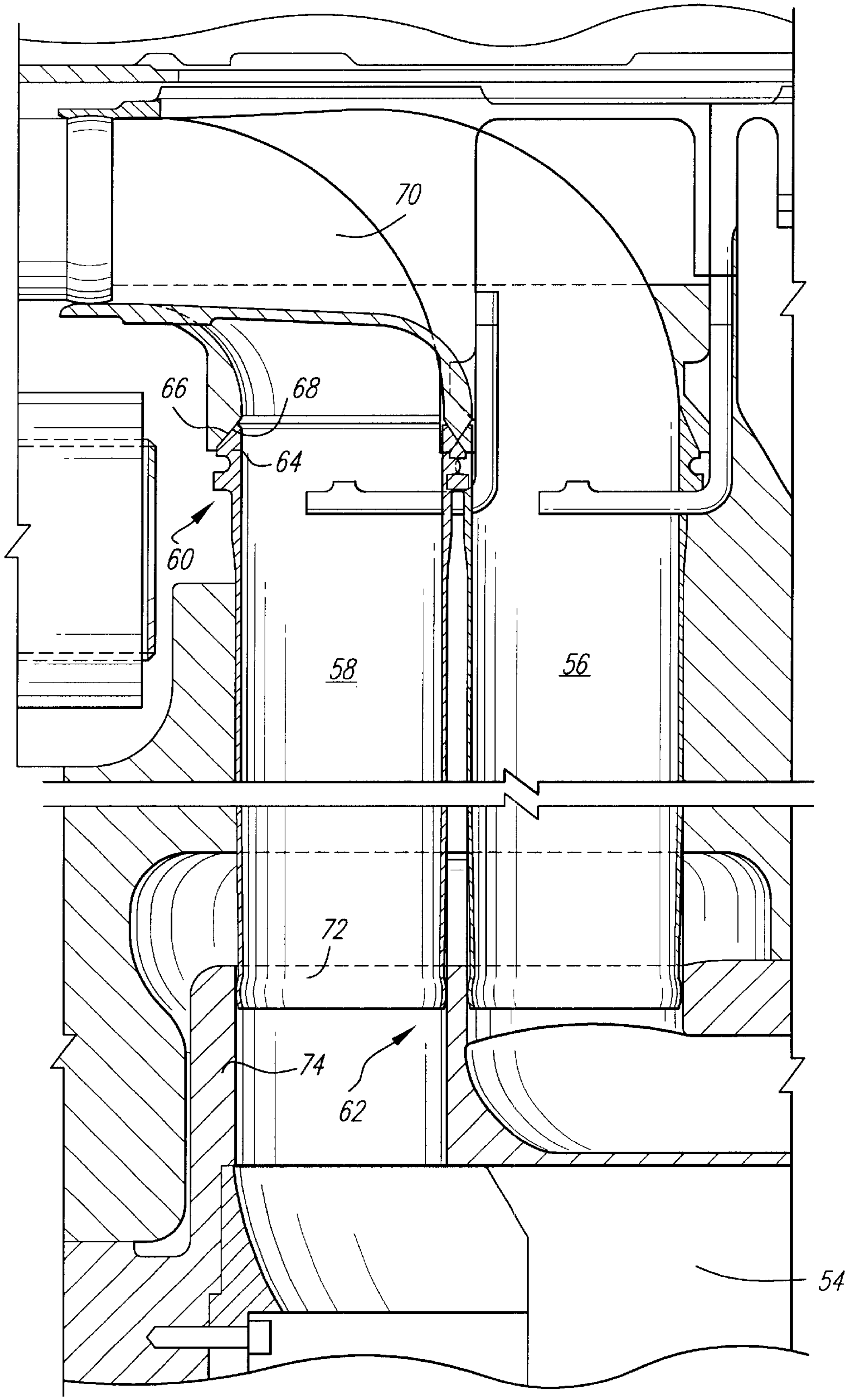
FIG. 2 is a side section of the connector tube in accordance with an exemplary embodiment of the invention.

With reference also to FIG. 2, the radial connector tubes 56, 58 accordance with an exemplary embodiment of the invention are identical and only tube 58 will be described in detail. Connector tube 58 includes a tubular body with a conventional "B-nut" 60 at its radially outer end, and a "half-spoolie" connector 62 at its opposite, radially inner end. The "B-nut" 60 at the radially outer end includes a radial flange 64 and a spherically-shaped or tapered surface 66. The latter is designed to engage a flat, annular tapered surface 68 of, in this case, an axially aligned end of an elbow 70 which is connected at its opposite end to the radially outer axial tube 57. This is a conventional seal connection between adjacent tubular members, but is especially useful here, where the connector is subjected to centrifugal forces, tending to move the connector tube 56 in a radial outward direction. In other words, the spherical end of the tube 58 will maintain sealing contact with the mating surface 68 of the elbow 70, adjusting as necessary to any relative movement between the parts. The B-nut 60 itself may be welded to the end of the tubular member 56 opposite the spoolie, or formed integrally therewith.

At the radially inner end, i.e., the spoolie end, the tube 56 has an enlarged end due to a radiused enlargement, forming an annular, part spherical-shaped end 72 (also referred to as a part or half-spoolie) which fits inside a straight or cylindrical end or tubular bushing 74 extending radially from the radially inner axial tube 54. In this way, thermal growth of tube 58 is accommodated at the inner radial end of the tube, while any relative axial shifting motion between the inner and outer radial tubes is accommodated at the "B-nut" connection at the radially outer end of the tube.

In the exemplary embodiment, the spoolie surface is coated on its exterior with a wear resistant coating, e.g., a commercially available cobalt base coating alloy known as Tribaloy.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a land base turbine having a rotor assembly and plurality of stages, each stage including a wheel supporting a plurality of buckets, a cooling circuit including at least first and second axially extending tubes radially offset relative to each other, and a radially oriented tube coupling said first and second axially extending tubes, said radially oriented tube having an internal diameter, a first free end including an annular radial flange having a tapered surface adapted to engage a complementary seating surface on a first of said two tubular components, said internal diameter remaining constant through said first free end; and a second free end having an annular bulbous shape adapted to seat within a cylindrical end of a second of said two tubular components.

2. The tubular connector of claim 1 wherein said bulbous shape is provided in the form of a partial toroid.

3. The tubular connector of claim 1 wherein said second free end is coated on an exterior surface thereof with a wear-resistant material.

4. The tubular connector of claim 3 wherein said wear-resistant material comprises a cobalt-based alloy.

5. The tubular connector of claim 1 wherein said tapered surface is part spherical in shape.

* * * * *